(12) United States Patent
Marzolla et al.

(10) Patent No.: US 9,803,040 B2
(45) Date of Patent: Oct. 31, 2017

(54) PROPYLENE-BASED TERPOLYMERS FOR FILMS

(75) Inventors: Roberta Marzolla, Ferrara (IT); Monica Galvan, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 742 days.

(21) Appl. No.: 14/239,019

(22) PCT Filed: Aug. 31, 2012

(86) PCT No.: PCT/EP2012/066927
§ 371 (c)(1),
(2), (4) Date: Feb. 14, 2014

(87) PCT Pub. No.: WO2013/030314
PCT Pub. Date: Mar. 7, 2013

(65) Prior Publication Data
US 2014/0212608 A1    Jul. 31, 2014

Related U.S. Application Data

(60) Provisional application No. 61/530,829, filed on Sep. 2, 2011.

(30) Foreign Application Priority Data

Sep. 1, 2011  (EP) .................................. 11179698
Aug. 1, 2012  (EP) .................................. 12178797

(51) Int. Cl.
| | | |
|---|---|---|
| C08F 210/06 | (2006.01) |
| C08F 210/14 | (2006.01) |
| C08F 210/16 | (2006.01) |
| C08J 5/18 | (2006.01) |
| B29C 49/00 | (2006.01) |
| C08F 2/00 | (2006.01) |
| B65D 1/02 | (2006.01) |
| C08F 10/00 | (2006.01) |

(52) U.S. Cl.
CPC ........ *C08F 210/14* (2013.01); *B29C 49/0005* (2013.01); *B65D 1/0207* (2013.01); *C08F 2/001* (2013.01); *C08F 210/06* (2013.01); *C08J 5/18* (2013.01); *C08F 10/00* (2013.01); *C08J 2323/16* (2013.01); *Y10T 428/1352* (2015.01)

(58) Field of Classification Search
CPC ....... C08J 2323/16; C08J 5/18; B65D 1/0207; B29C 49/0005; C08F 210/06; C08F 10/00; C08F 210/14; C08F 2/001; C08F 210/16; C08F 2500/12; C08F 2500/26; C08F 4/6465; C08F 4/6543; Y10T 428/1352
See application file for complete search history.

(56) References Cited

FOREIGN PATENT DOCUMENTS

| | | |
|---|---|---|
| EP | 1243612 A2 | 9/2002 |
| EP | 1941997 A1 | 7/2008 |
| WO | WO2006/002778 A1 | 1/2006 |
| WO | WO2011/128146 A1 | 10/2011 |
| WO | WO2012/031951 A1 | 3/2012 |

OTHER PUBLICATIONS

PCT International Search Report & Written Opinion dated Nov. 27, 2012, for PCT/EP2012/066927.

*Primary Examiner* — Yan Lan

(57) ABSTRACT

A terpolymer containing propylene, ethylene and an alpha olefins of formula $CH_2=CHZ$ wherein Z is an hydrocarbon group having from 2 to 10 carbon atoms wherein:
  (i) the content of ethylene derived units ranges from 0.5 wt % to 5.0 wt %;
  (ii) the content of alpha olefin derived units ranges from 1.0 wt % to 5.0 wt %;
  (iii) the area of the DSC curve after the peak of the melting point (Tm) represents more than 22%; of the total area of the DSC curve;
  (iv) the polydispersity index (PI) ranges from 2.0 to 7.0.

7 Claims, No Drawings

PROPYLENE-BASED TERPOLYMERS FOR FILMS

This application is the U.S. National Phase of PCT International Application PCT/EP2012/066927, filed Aug. 31, 2012, claiming priority of European Patent Application No. 11179698.3, filed Sep. 1, 2011, European Patent Application No. 12178797.2, filed Aug. 1, 2012, and the benefit under 35 U.S.C. 119(e) of U.S. Provisional Application No. 61/530,829 filed Sep. 2, 2011, the contents of which are incorporated herein by reference in their entirety.

FIELD OF THE INVENTION

The present invention relates to a propylene/ethylene/1-hexene terpolymer particularly fit for the production of biaxially oriented films and blow moulding applications such as bottles.

BACKGROUND OF THE INVENTION

Propylene/ethylene/1-hexene terpolymers are already known in the art for the production of pipes or films.

EP 483 523 relates to a compositions of crystalline polymers of propylene of this invention comprise (weight percentage):
A) 30-65%, preferably 35-65%, more preferably 45-65%, of a copolymer of propylene with a $C_4$-$C_8$ alpha olefin containing from 98 to 80%, preferably from 95 to 85%, of propylene;
B) 35-70%, preferably 35-65%, more preferably 35-55%, of a copolymer of propylene with ethylene, and optionally from 2 to 10%, preferably from 3 to 6%, of a $C_4$-$C_8$ alpha-olefin, said copolymer containing 2 to 10% ethylene, preferably from 7 to 9% when the $C_4$-$C_8$ alpha-olefin is not present, and 0.5 to 5%, preferably from 1 to 3% ethylene, when the $C_4$-$C_8$ alpha-olefin is present.

The $C_4$-$C_8$ alpha-olefin is preferably selected from 1-butene; 1-pentene; 1-hexene; 4-methyl-1-pentene; and 1-octene. Particularly preferred is 1-butene.

Better results in terms of seal initiation temperature can be obtained by using 1-hexene instead of the preferred monomer 1-butene in particular ranges.

WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt. The applicant found that it is possible to select from these ranges a composition having improved properties to be used for films.

U.S. Pat. No. 6,365,682 relates to propylene based terpolymers to be used for films. The ethylene content ranges generally from 1 to 10 wt % and the alpha olefin ranges from 5 to 25 wt %. for the preparation of films terpolymers having an ethylene content ranging from 0.9 to 3 wt % and an alpha olefin content ranging from 1 to 15 wt % is indicated. Only terpolymer of propylene/ethylene and 1-butene are exemplified. The applicant found that when 1-hexene is used in particular amount the characteristics of the films can be improved.

The applicant has now found that by using a particular polymerization process it is possible to obtain terpolymers having an high melting point, a vey low seal initiation temperature (SIT) at a relatively low content of comonomers. This allows obtaining films with improved features by using low amount of comonomers.

SUMMARY OF THE INVENTION

Thus an object of the present inventions is a terpolymer containing propylene, ethylene and an alpha olefins of formula $CH_2=CHZ$ wherein Z is an hydrocarbon group having from 2 to 10 carbon atoms such as 1-butene, 1-hexene, 1-octene; preferably the alpha olefin is 1-hexene; wherein
(i) the content of ethylene derived units ranges from 0.5 wt % to 5.0 wt %, preferably from 1.0 wt % to 3.0 wt %; more preferably from 1.2 wt % to 2.5 wt %
(ii) the content of alpha olefin derived units ranges from 1.0 wt % to 5.0 wt %, preferably from 2.0 wt % to 4.0 wt %; more preferably from 2.5 wt % to 3.5 wt;
(iii) the area of the DSC curve after the peak of the melting point (Tm) represents more than 22%; preferably more than 25%, more preferably more than 28% of the total area of the DSC curve;
(iv) the polydispersity index (PI) ranges from 2.0 to 7.0, preferably from 3.0 to 6.5, more preferably from 3.5 to 6.0.

DETAILED DESCRIPTION OF THE INVENTION

The terpolymer object of the present invention contains only propylene, ethylene and one alpha olefin, the sum of these three comonomers derived units content being 100.

The melting temperature (melting point), crystallization temperature and partial area percentage are determined by differential scanning calorimetry (DSC) by using the following method:.

A sample weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read. For partial area calculation the same melting peak considered for Tm calculation is used. A baseline to the peak is built by joining the peak initiation and end temperatures at which the endothermic peak begins and ends to deviate from the relatively straight baseline. Partial area is calculated by taking as starting point the Tm temperature and as end point the peak end temperature. Results are expressed in percentage of total area.

Preferably the terpolymer of the present invention is further endowed with:
(v) the area of the DSC curve between the peak of the melting point and Tm+5° C. is lower than 19%; preferably lower than 15%; more preferably lower than 13% of the total area of the DSC curve.

Preferably the amount (Wt %) of alpha-olefin (C6), the amount (Wt %) of ethylene (C2) and the melting point (Tm) of the terpolymer fulfil the following relation (1)

$$Tm>157-(C2+0.8C6)*6 \qquad (1)$$

Preferably relation (1) is $Tm>158-(C2+0.8C6)*6$; more preferably $Tm>159-(C2+0.8C6)*6$;

The terpolymer of the present invention preferably exhibits a seal initiation temperature (SIT) comprised between 90° C. and 120° C., more preferably between 100° C. and 115° C.; even more preferably between 102° C. and 113° C.

The crystallization temperature preferably ranges from 70° C. to 100° C., preferably from 80° C. to 95° C.; more preferably from 85° C. to 95° C.;

The melt flow rate (MFR) (ISO 1133 230° C., 2.16 kg) of the terpolymer of the present invention ranges from 0.5 to 20 g/10 min; preferably from 1 to 10 g/10 min.

In order to achieve the MFR of the terpolymer of the present invention it is also possible to visbreak a polymer having a lower MFR. In order to visbreak the polymer known visbreaking agent can be used such as peroxides. With the visbreaking it is possible to fine tune the MFR of the product.

The terpolymers of the present invention have a stereoregularity of isotactic type of the propylenic sequences this is clear by the low value of xylene extractables that is lower than 15 wt %.

Without to be bound by a theory it is believed that the fact that the area of the DSC curve after the melting point peak is relatively larger reflect the presence of high melting point terpolymer fractions. Therefore by using the polymerization process described below it is possible to obtain a terpolymer that is multimodalized in composition, i.e. the resulting terpolymer contains various fractions having a low content of comonomers, said fractions being responsible of the high melting point and said terpolymer contains fractions having a quite high comonomer content, said fractions being responsible of the low SIT. This is also confirmed by the fact that even at high comonomers content the terpolymers of the present invention show an high melting point.

The high melting point fractions allow the terpolymer to be easily processed especially in the production of films. At the same time the low SIT allows the terpolymer to be used easily in various materials such as multilayer films.

The terpolymer of the present invention due to the high transparency and impact properties specially at low temperature are also fit for the production of blow molded articles, especially bottles and the like.

Thus a further object of the present invention is a blow molded article such as bottles comprising the terpolymer of the present invention.

The terpolymer of the present invention can be prepared by polymerisation in one or more polymerisation steps. Such polymerisation can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are esters of phtalic acid and 1,3-diethers of formula:

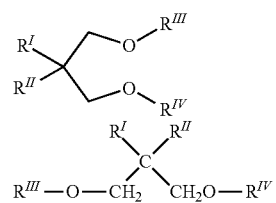

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl)fluorene.

Other suitable electron-donor compounds are phthalic acid esters, such as diisobutyl, dioctyl, diphenyl and benzylbutyl phthalate.

The preparation of the above mentioned catalyst component is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si-OR bond, where R is a hydrocarbon radical.

Examples of silicon compounds are (tert-butyl)$_2$Si (OCH$_3$)$_2$, (cyclohexyl)(methyl)Si (OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the terpolymers are preferably prepared by using catalysts containing a phthalate as internal donor and (cyclopentyl)$_2$Si(OCH$_3$)$_2$ as outside donor, or the said 1,3-diethers as internal donors.

The said propylene-ethylene-hexene-1 polymers are produced with a polymerization process illustrated in EP application 1 012 195.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The terpolymer of the present invention, may be blended with additives commonly employed in the art, such as antioxidants, light stabilizers, heat stabilizers, nucleating agents, colorants and fillers.

A further object of the present invention are films, in particularly biaxially oriented films (BOPP) comprising the terpolymer of the present invention.

EXAMPLES

The following examples are given to illustrate the present invention without limiting purpose.

Characterization Methods

Melting temperature, crystallization temperature and partial area percentage determination: Determined by differential scanning calorimetry (DSC). A sample weighting 6±1 mg, is heated to 220±1° C. at a rate of 20° C./min and kept at 220±1° C. for 2 minutes in nitrogen stream and it is thereafter cooled at a rate of 20° C./min to 40 ±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

For partial area calculation the same melting peak considered for Tm calculation is used.

A baseline to the peak is built by joining the peak initiation and end temperatures at which the endothermic peak begins and ends to deviate from the relatively straight baseline.

Partial area is calculated by taking as starting point the Tm temperature and as end point the peak end temperature.

Results are expressed in percentage of total area.

Melt Flow Rate: Determined according to the method ISO 1133 (230° C., 2.16 kg).

Solubility in xylene: Determined as follows.

2.5 g of polymer and 250 ml of xylene are introduced in a glass flask equipped with a refrigerator and a magnetical stirrer. The temperature is raised in 30 minutes at 135° C. The so obtained clear solution is then kept under reflux and stirring for further 30 minutes. The closed flask is kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 70° C. under vacuum until constant weight is obtained. The weight percentage of polymer soluble in xylene at room temperature is then calculated.

1-hexene and ethylene content: Determined by $^{13}$C-NMR spectroscopy in terpolymers:

NMR analysis. $^{13}$C NMR spectra are acquired on an AV-600 spectrometer operating at 150.91 MHz in the Fourier transform mode at 120° C. The peak of the propylene CH was used as internal reference at 28.83. The $^{13}$C NMR spectrum is acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program [(1)] | ZGPG |
| Pulse Length (P1) [(2)] | for 90° |
| Total number of points (TD) | 32K |
| Relaxation Delay [(2)] | 15 s |
| Number of transients [(3)] | 1500 |

The total amount of 1-hexene and ethylene as molar percent is calculated from diad using the following relations:

$[P]=PP+0.5PH+0.5PE$ $[H]=HH+0.5PH$ $[E]=EE+0.5PE$

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$P.I.=10^5/Gc$ in which Gc is the crossover modulus which is defined as the value (expressed in Pa) at which G'=G" wherein G' is the storage modulus and G" is the loss modulus.

Seal Initiation Temperature (SIT)
Preparation of the Film Specimens

Some films with a thickness of 50 μm are prepared by extruding each test composition ina a single screw Collin extruder (length/diameter ratio of screw 1:25) at a film drawing speed of 7 m/min and a melt temperature do 210-250° C. Each resulting film is superimposed on a 1000 μm thick film of a propylene homopolymer having a xylene insoluble fraction of 97 wt % and a MFR L of 2 g/10 min. The superimposed films are bonded to each other in a Carver press at 200° C. under a 9000 kg load, which is maintained for 5 minutes. The resulting laminates are stretched longitudinally and transversally, i.e. biaxially, by a factor 6 with a TOM Long film stretcher at 150° C., thus obtaining a 20 μm thick film (18 μm homopolymer+2 μm test).

2×5 cm specimens are cut from the films.
Determination of the SIT

For each test two of the above specimens are superimposed in alignment, the adjacent layers being layers of the particular test composition. The superimposed specimens are sealed along one of the 2 cm sides with a Brugger Feinmechanik Sealer, model HSG-ETK 745. Sealing time is 5 seconds at a pressure of 0.1 N/mm² The sealing temperature is increased of 2° C. for each seal, starting from about 10° C. less than the melting temperature of the test composition. The sealed samples are left to cool and then their unsealed ends are attached to an Instron machine where they are tested at a traction speed of 50 mm/min.

The SIT. is the minimum sealing temperature at which the seal does not break when a load of at least 2 Newtons is applied in the said test conditions.

Haze on Film

Determined on 50 μm thick cast films of the test composition. The measurement was carried out on a 50×50 mm portion cut from the central zone of the film.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Gloss on Film

Determined on the same specimens as for the Haze.

The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Example 1 and Comparative Example 2

A copolymer is prepared by polymerising propylene, ethylene and hexene-1 in the presence of a catalyst under continuous conditions in a plant comprising a polymerisation apparatus as described in EP 1 012 195.

The catalyst is sent to the polymerisation apparatus that comprises two interconnected cylindrical reactors, riser and downcomer. Fast fluidisation conditions are established in the riser by recycling gas from the gas-solid separator.

In examples 1 the gas composition in the two reactor legs has been differentiated by using the "barrier" feed according to what described in EP 1 012 195. This stream is propylene fed in the larger upper part of the downcomer. In comparative example 2 the barrier feed has not been used.

The catalyst employed comprises a catalyst component prepared by analogy with example 5 of EP-A-728 769 but using microspheroidal $MgCl_2 \cdot 1.7C_2H_5OH$ instead of $MgCl_2 \cdot 2.1C_2H_5OH$. Such catalyst component is used with dicyclopentyl dimethoxy silane (DCPMS) as external donor and with triethylaluminium (TEA).

The polymer particles exiting the reactor are subjected to a steam treatment to remove the reactive monomers and volatile substances and then dried. The main operative conditions are indicated in Table 1. The characteristics of the produced polymers are indicated in Table 3.

TABLE 1

| Examples | | 1 | 2* |
|---|---|---|---|
| TEA/solid catalyst component, g/g | | 10 | 5 |
| TEA/DCPMS, g/g | | 4 | 4 |
| $C_6/(C_3 + C_6)$, mol/mol | Riser | 0.039 | 0.034 |
| $C_6/(C_3 + C_6)$, mol/mol | Downcomer | 0.084 | 0.034 |
| $C_2/(C_3 + C_2)$, mol/mol | Riser | 0.02 | 0.015 |
| $C_2/(C_3 + C_2)$, mol/mol | Downcomer | 0.006 | 0.015 |

C2 ethylene; C3 propylene; C6 1-hexene
*comparative

The Examples haven been added to additives and peroxides according to table 2. Then the polymer mixture is placed in a twin screw extruder Berstorff (L/D=33) and extruded in the following operating conditions:
temperature of feeding part: 190-210° C.;
melt temperature: 235-245° C.;
temperature of die part: 210° C.;
flow rate: 15 kg/h;
rotational speed of the screw: 250 rpm.

TABLE 2

| examples | | 1 | 2* |
|---|---|---|---|
| Irganox 1010 | wt % | 0.05 | 0.05 |
| Calcium stearate | wt % | 0.05 | 0.05 |
| Irgafos 168 | wt % | 0.1 | 0.1 |
| Luperox 101 | wt % | 0.027 | 0.025 |

*Comparative

Preparation of BOPP Film:

From pellet samples of the obtained polypropylenes, several plaques 950 nm to 1050 nm thick with size 60 mm×60 mm were obtained via compression moulding. By a film stretcher kept at 150±5° C. 5 specimen with the listed dimensions were simultaneously oriented at a fixed stretch ratio of 7 times in machine direction and 7 times in transverse machine direction. Final film thickness of the biaxially oriented film is around 20 nm.

TABLE 3

| Example | | 1 | 2* |
|---|---|---|---|
| MFR | g/10 min | 6.3 | 6.4 |
| C6 NMR | % | 3.4 | 2.8 |
| C2 NMR | % | 1.9 | 1.5 |

TABLE 3-continued

| Example | | 1 | 2* |
|---|---|---|---|
| PI | | 4.2 | 4 |
| XS | % | 12 | 8 |
| Tm | ° C. | 134.5 | 134.1 |
| Tc | ° C. | 88.3 | 91.3 |
| SIT on BOPP | ° C. | 105 | 112 |
| Haze on film | % | 0.4 | 1 |
| Area of the DSC after the melting point (Tm) | % | 28 | 19 |
| Area of the DSC between the melting point (Tm) and Tm + 5° C. | % | 12 | 12 |

C2 ethylene; C3 propylene; C6 1-hexene; XS xylene solubles
*comparative

The terpolymer of comparative example 2 has the same melting point of the terpolymer of example 1 but different comonomers content. The Area of the DSC after the melting point (Tm) is lower than 22% and even in this case the sit of the terpolymers of the invention is considerably lower.

To the terpolymer of example 1, 0.25 wt % of NX8500e (a clarifying agent of Millichen) has been added. And a blow molded bottle has been produced. The haze, top load and Izod at 4° C. has been measured on the bottle giving respectively 14%; 381 kJ/m² and 83 kJ/m²

What is claimed is:

1. A film comprising a propylene, ethylene and 1-hexene terpolymer comprising:
    (i) an ethylene content of 1.0-3.0 wt %;
    (ii) a 1-hexene content of 2.0-4.0 wt %;
    (iii) an area of a differential scanning calorimetry (DSC) curve after the peak of the melting point ($T_m$) of greater than about 22% of the total area of the DSC curve; and
    (iv) a polydispersity index (PI) of 2.0-7.0;
wherein the film comprises a melt flow rate (ISO 1133, 230° C., 2.16 kg) of no greater than 6.3 g/10 min and a haze value as measured on a 50 μm cast film of no greater than 0.4%.

2. The film of claim 1, wherein the area of the DSC curve after the peak of the melting point (Tm) comprises greater than 25% of the total area of the DSC curve.

3. The film of claim 1, wherein the area of the DSC curve between the peak of the melting point (Tm) and Tm+5° C. is lower than 19% of the total area of the DSC curve.

4. The film of claim 1, wherein the amount (Wt %) of alpha-olefin ($C_6$), the amount (Wt %) of ethylene ($C_2$) and the melting point ($T_m$) of the terpolymer fulfill the following relationship (1):

$$Tm>157-(C_2+0.8C_6)*6[[+157]] \qquad (1).$$

5. The film of claim 1, having a seal initiation temperature (SIT) ranging from 90-120° C.

6. The film of claim 1, having the crystallization temperature ranging from 70-100° C.

7. The film of claim 1, wherein the film is a biaxially oriented film (BOPP).

* * * * *

UNITED STATES PATENT AND TRADEMARK OFFICE
CERTIFICATE OF CORRECTION

PATENT NO. : 9,803,040 B2
APPLICATION NO. : 14/239019
DATED : October 31, 2017
INVENTOR(S) : Roberta Marzolla et al.

It is certified that error appears in the above-identified patent and that said Letters Patent is hereby corrected as shown below:

On the Title Page

| | | |
|---|---|---|
| Item (57) | Line 2 | In the Abstract, delete "CH2=CHZ" and insert --$CH_2$=CHZ-- |
| Item (57) | Line 9 | In the Abstract, delete "(Tm)" and insert --($T_m$)-- |
| Item (57) | Line 9 | In the Abstract, delete "22%;" and insert --22%-- |

In the Specification

| | | |
|---|---|---|
| Column 1 | Line 55 | Delete "wt %." and insert --wt %-- |
| Column 1 | Line 64 | Delete "vey" and insert --very-- |
| Column 2 | Line 5 | Delete "CH2=CHZ" and insert --$CH_2$=CHZ-- |
| Column 2 | Line 11 | After "2.5 wt %", insert --;-- |
| Column 2 | Line 16 | Delete "(Tm)" and insert --($T_m$)-- |
| Column 2 | Line 33 | Delete "method:." and insert --method:-- |
| Column 2 | Line 43 | Delete "Tm" and insert --$T_m$-- |
| Column 2 | Line 48 | Delete "Tm" and insert --$T_m$-- |
| Column 2 | Line 53 | Delete "Tm+5° C." and insert --$T_m$+5° C.-- |
| Column 2 | Line 56 | Delete "(C6)," and insert --($C_6$),-- |
| Column 2 | Line 57 | Delete "(C2)" and insert --($C_2$)-- |
| Column 2 | Line 57 | Delete "(Tm)" and insert --($T_m$)-- |
| Column 2 | Line 59 | Delete "Tm>157-(C2+0.8C6)*6" and insert --$T_m$>157-($C_2$+0.8$C_6$)*6.-- |
| Column 2 | Line 62 | Delete "Tm>158-(C2+0.8C6)*6;" and insert --$T_m$>158-($C_2$+0.8$C_6$)*6;-- |
| Column 2 | Line 63 | Delete "Tm>159-(C2+0.8C6)*6;" and insert --$T_m$>159-($C_2$+0.8$C_6$)*6.-- |
| Column 3 | Line 3 | Delete "95° C.;" and insert --95° C.-- |
| Column 4 | Line 35 | Delete "2 -methyl-2-is opropyl-1,3-dimethoxypropane," and insert --2-methyl-2-isopropyl-1,3-dimethoxypropane,-- |

Signed and Sealed this
Third Day of March, 2020

Andrei Iancu
*Director of the United States Patent and Trademark Office*

CERTIFICATE OF CORRECTION (continued)
U.S. Pat. No. 9,803,040 B2

| Column 5 | Line 16 | Delete "(cyclohexyl)(methyl)Si (OCH$_3$)$_2$," and insert --(cyclohexyl)(methyl)Si(OCH$_3$)$_2$,-- |
| Column 6 | Line 48 | Delete "Tm" and insert --T$_m$-- |
| Column 6 | Line 53 | Delete "Tm" and insert --T$_m$-- |
| Column 7 | Line 67 | Delete "ina" and insert --in-- |
| Column 8 | Line 19 | After "N/mm$^2$", insert --.-- |
| Column 8 | Line 25 | Delete "SIT." and insert --SIT-- |
| Column 9 | Line 10 | In Table 1, delete "C2" and insert --C$_2$-- |
| Column 9 | Line 10 | In Table 1, delete "C3" and insert --C$_3$-- |
| Column 9 | Line 10 | In Table 1, delete "C6" and insert --C$_6$-- |
| Column 9 | Line 41 | Delete "nm" and insert --μm-- |
| Column 9 | Line 41 | Delete "nm" and insert --μm-- |
| Column 9 | Line 47 | Delete "nm." and insert --μm.-- |
| Column 9 | Line 3 | In Table 3, delete "C6" and insert --C$_6$-- |
| Column 9 | Line 4 | In Table 4, delete "C2" and insert --C$_2$-- |
| Column 10 | Line 4 | In Table 4, delete "Tm" and insert --T$_m$-- |
| Column 10 | Line 9 | In Table 3, delete "(Tm)" and insert --(T$_m$)-- |
| Column 10 | Line 11 | In Table 3, delete "(Tm)" and insert --(T$_m$)-- |
| Column 10 | Line 12 | In Table 3, delete "Tm" and insert --T$_m$-- |
| Column 10 | Line 13 | In Table 3, delete "C2" and insert --C$_2$-- |
| Column 10 | Line 13 | In Table 3, delete "C3" and insert --C$_3$-- |
| Column 10 | Line 13 | In Table 3, delete "C6" and insert --C$_6$-- |
| Column 10 | Line 18 | Delete "Area" and insert --area-- |
| Column 10 | Line 19 | Delete "(Tm)" and insert --(T$_m$)-- |
| Column 10 | Line 19 | Delete "sit" and insert --SIT-- |
| Column 10 | Line 25 | After "kJ/m$^2$", insert --.-- |

In the Claims

| Column 10 | Line 38 | In Claim 2, delete "(Tm)" and insert --(T$_m$)-- |
| Column 10 | Line 41 | In Claim 3, delete "(Tm)" and insert --(T$_m$)-- |
| Column 10 | Line 41 | In Claim 3, delete "Tm+5° C." and insert --T$_m$+5° C.-- |
| Column 10 | Line 47 | In Claim 4, delete "Tm>157-(C$_2$+0.8C$_6$)*6[[+157]]" and insert --T$_m$>157-(C$_2$+0.8C$_6$)*6-- |